United States Patent
Anderson et al.

(10) Patent No.: US 11,237,877 B2
(45) Date of Patent: Feb. 1, 2022

(54) ROBOT SWARM PROPAGATION USING VIRTUAL PARTITIONS

(71) Applicant: Intel Corporation, Santa Clara, CA (US)

(72) Inventors: Glen J. Anderson, Beaverton, OR (US); Vinayak Honkote, Bangalore (IN); Dibyendu Ghosh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 15/855,123

(22) Filed: Dec. 27, 2017

(65) Prior Publication Data
US 2019/0050269 A1  Feb. 14, 2019

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,374,155 B1 * | 4/2002 | Wallach | G05D 1/0274 700/245 |
| 6,507,771 B2 * | 1/2003 | Payton | G05D 1/0242 318/568.1 |
| 6,560,512 B1 * | 5/2003 | Rosen | B25J 9/1664 700/245 |
| 6,577,906 B1 * | 6/2003 | Hurtado | G05B 19/41865 700/2 |
| 6,636,781 B1 * | 10/2003 | Shen | B08B 9/045 318/568.11 |
| 6,687,571 B1 * | 2/2004 | Byrne | G05D 1/0289 700/225 |
| 6,842,674 B2 * | 1/2005 | Solomon | B64C 39/024 342/350 |
| 6,904,335 B2 * | 6/2005 | Solomon | F41H 13/00 318/568.11 |

(Continued)

OTHER PUBLICATIONS

S. Dolev, L. Lahiani, and M. Yung, "Secret Swarm Unit: Reactive k-Secret Sharing," In Proc. of the 8th International Conference on Cryptology in India, pp. 123-137, 2007, 15 pages.

(Continued)

*Primary Examiner* — Bhavesh V Amin
(74) *Attorney, Agent, or Firm* — Hanley Flight & Zimmerman, LLC

(57) ABSTRACT

Methods, apparatus, systems and articles of manufacture are disclosed Systems, apparatus, and methods to propagate a robot swarm using virtual partitions are disclosed. An example apparatus includes a transceiver to broadcast the availability of the apparatus to host one or more bots from a swarm of bots and to receive a copy request from a bot in the swarm of bots. The example apparatus also includes an evaluator to evaluate instructions from the bot and determine if the apparatus is equipped to propagate the bot. In addition, the example apparatus includes a virtual partition to provide an interface for executing a copy of the bot.

20 Claims, 7 Drawing Sheets

(56) References Cited

U.S. PATENT DOCUMENTS

| | | | | |
|---|---|---|---|---|
| 7,047,861 | B2* | 5/2006 | Solomon | B64C 39/024 318/568.12 |
| 7,305,371 | B2* | 12/2007 | Brueckner | B25J 9/1617 706/45 |
| 7,343,222 | B2* | 3/2008 | Solomon | F41H 13/00 318/568.11 |
| 7,409,266 | B2* | 8/2008 | Hara | B64C 33/025 700/245 |
| 7,765,038 | B2* | 7/2010 | Appleby | F41H 13/00 701/23 |
| 8,112,176 | B2* | 2/2012 | Solomon | G05D 1/0088 700/245 |
| 8,290,619 | B2* | 10/2012 | McLurkin | G05D 1/0297 700/245 |
| 8,838,271 | B2* | 9/2014 | Ghose | G01T 7/00 700/248 |
| 9,043,021 | B1* | 5/2015 | Clark | A47L 11/4061 700/248 |
| 9,102,406 | B2* | 8/2015 | Stark | G05D 1/0027 |
| 9,446,512 | B1* | 9/2016 | Moses | G05D 1/0088 |
| 10,304,940 | B1* | 5/2019 | Ghani | H01L 21/823481 |
| 10,310,518 | B2* | 6/2019 | MacCready | G05D 1/0206 |
| 2002/0094780 | A1* | 7/2002 | Payton | H04L 41/046 455/41.2 |
| 2002/0138179 | A1* | 9/2002 | Payton | G05D 1/0242 701/1 |
| 2003/0142851 | A1* | 7/2003 | Brueckner | G01S 5/0289 382/107 |
| 2003/0212472 | A1* | 11/2003 | McKee | G05D 1/0274 700/245 |
| 2003/0221114 | A1* | 11/2003 | Hino | G06F 21/31 713/189 |
| 2004/0030448 | A1* | 2/2004 | Solomon | G05D 1/0088 700/245 |
| 2004/0030449 | A1* | 2/2004 | Solomon | H04B 7/18517 700/245 |
| 2004/0030450 | A1* | 2/2004 | Solomon | F41H 13/00 700/245 |
| 2004/0030570 | A1* | 2/2004 | Solomon | G05D 1/104 700/248 |
| 2004/0030571 | A1* | 2/2004 | Solomon | F41H 13/00 700/248 |
| 2004/0068351 | A1* | 4/2004 | Solomon | G05D 1/104 701/24 |
| 2004/0068415 | A1* | 4/2004 | Solomon | G05D 1/0088 89/1.11 |
| 2004/0068416 | A1* | 4/2004 | Solomon | G05D 1/0088 446/454 |
| 2004/0134336 | A1* | 7/2004 | Solomon | B64C 39/024 89/1.11 |
| 2005/0080799 | A1* | 4/2005 | Hamden | H04L 63/102 |
| 2005/0183569 | A1* | 8/2005 | Solomon | G05D 1/0088 89/1.11 |
| 2005/0268298 | A1* | 12/2005 | Hunt | G06F 9/5077 718/1 |
| 2006/0079997 | A1* | 4/2006 | McLurkin | G05D 1/0297 700/245 |
| 2006/0085106 | A1* | 4/2006 | Gaudiano | G05D 1/104 701/23 |
| 2006/0136667 | A1* | 6/2006 | Shultz | G06F 9/5077 711/118 |
| 2007/0288132 | A1* | 12/2007 | Lam | G05D 1/0278 701/23 |
| 2008/0059007 | A1* | 3/2008 | Whittaker | G08G 1/22 701/2 |
| 2008/0091300 | A1* | 4/2008 | Fletcher | G05D 1/0291 700/245 |
| 2008/0241264 | A1* | 10/2008 | Solomon | B82Y 10/00 424/490 |
| 2011/0135189 | A1* | 6/2011 | Lee | B25J 9/1682 382/153 |
| 2011/0264305 | A1* | 10/2011 | Choe | G05D 1/0274 701/2 |
| 2012/0036198 | A1* | 2/2012 | Marzencki | H04B 17/27 709/206 |
| 2015/0254123 | A1* | 9/2015 | Loekstad | G06F 11/079 714/42 |
| 2016/0259651 | A1* | 9/2016 | Nychis | G06F 9/4488 |
| 2017/0032300 | A1* | 2/2017 | Eggen | G06Q 10/06313 |

OTHER PUBLICATIONS

Laing et al., "Security in Swarm Robotics," in Handbook of Research on Design, Control, and Modeling of Swarm, Chapter 2, pp. 42-67, found at [https://books.google.com/books?hl=en&lr=&id=x_otCwAAQBAJ&oi=fnd&pg=PA42&dq=swarm+robotics+authentication&ots#v=onepage&q=swarm%20robotics%20authentication&f=false], 3 pages.

E.C. Ferrer, "The blockchain: a new framework for robotic swarm systems," Cornell University Library, Aug. 2016, online at https://arxiv.org/pdf/1608.00695.pdf, 12 pages.

* cited by examiner

ROBOT SWARM PROPAGATION USING VIRTUAL PARTITIONS

FIELD OF THE DISCLOSURE

This disclosure relates generally to robots, and, more particularly, to systems, apparatus, and methods for robot swarm propagation using virtual partitions.

BACKGROUND

Current swarm robotics utilize a plurality of individual devices to create a swarm. The devices tend to be simple, inexpensive, and homogenous and typically have limited operating resources.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
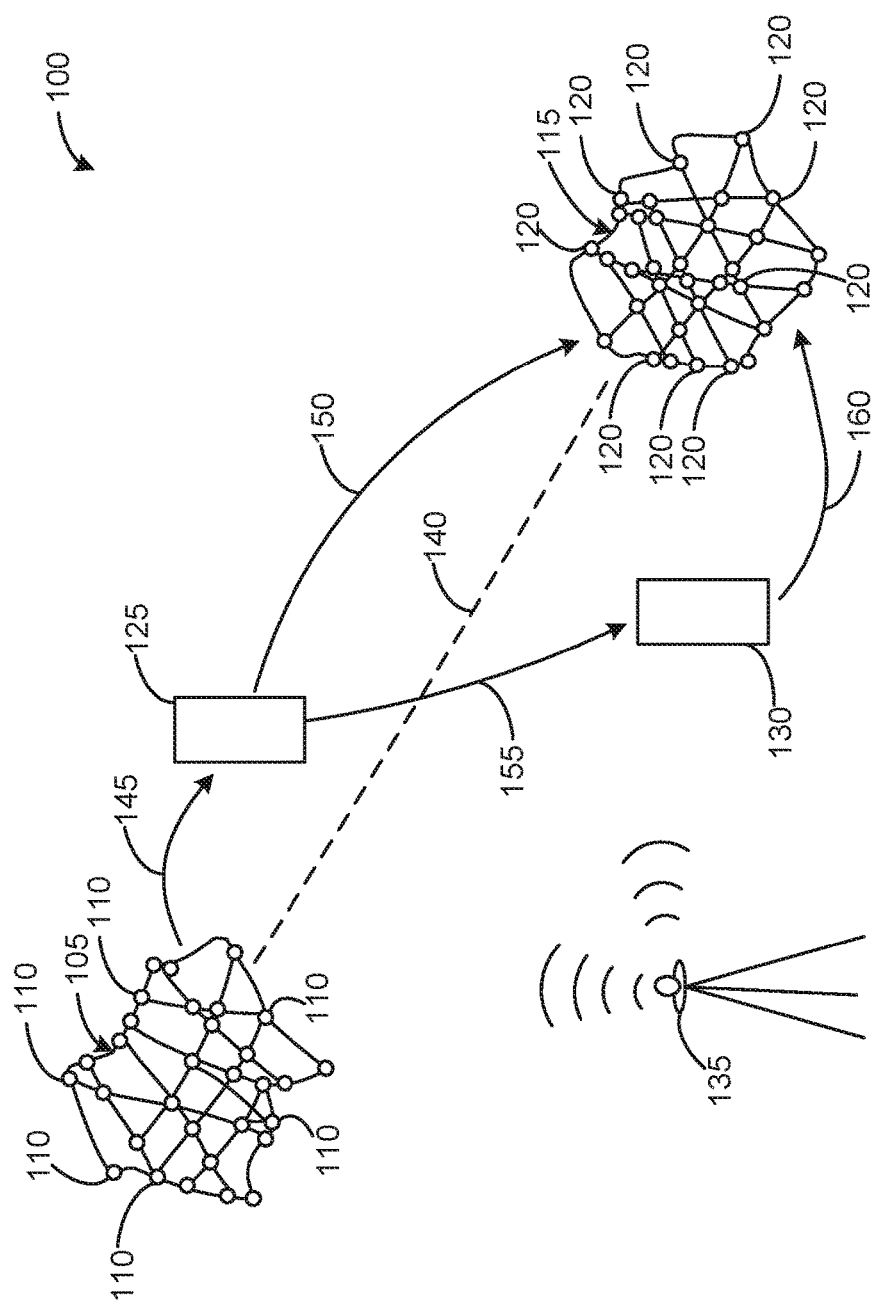
FIG. 1 is a schematic illustration of an example environment including a plurality of example swarms with a plurality of example bots and a plurality of example hosts to enable cross-swarm communication in accordance with teachings of this disclosure.

Disclosed herein are advancements to swarm robotics. An example swarm disclosed herein includes a plurality of individual autonomous devices including, for example, robots, drones, unmanned aerial vehicles (UAVs), machines, bots, etc. Throughout this disclosure the term "bot" refers to any type of machine or device, real or virtual, that can participate in (e.g., be a member of) a swarm. Thus, a bot can be any or all of a robot, a drone, a UAV, a machine, etc.

In some examples, bots in a swarm may have no individual identity. Communication within a swarm tends to be with other bots that are nearby and usually not directly back (or through) to a central computer. However, in other examples data from bots can be passed back to a central computer such as, for example, by being passed across a daisy chain of neighboring bots to a network access point. Swarm robotics is characterized by emergent behaviors or emergent properties from the plurality of bots. An emergent behavior is a behavior of a larger entity or population (e.g., a swarm) arising or emerging through interactions of component parts or individuals in the population (e.g., a plurality of bots). The larger entity exhibits behavior(s) and/or propert(ies) the individuals do not exhibit. In nature, bee hives, flocks of birds, and schools of fish exhibit emergence. In the context of bots, the emergent behaviors are at least partially the result of the members of the swarm acting independently, individual bots changing instructions and/or behavior based on information received from one or more neighboring bots, and/or individual bots changing instructions and/or behavior based on behavior of one or more neighboring bots. Thus, the resulting emergent behavior that arises from a given swarm is highly variable.

There are many applications for swarms including, for example, search and rescue. In a search and rescue example, each bot of the swarm has instructions and shares information with a neighbor bot about whether a given area has been searched and whether a target was discovered. Based on data passed across neighboring bots, the search instructions for one or more of the individual bots may be altered. Thus, a bot influences the behavior of one or more adjacent bots. Collectively, these individual influences cause the overall behavior of the swarm to change, for example, to move to a new search area and/or better cover an existing search area. The swarm also can be scaled up simply by adding additional bots to, for example, widen a search area and/or increase the granularity of the current search within the search area.

Swarms may also be used to perform surveillance. In a surveillance scenario, there may be multiple swarm networks patrolling an area. In addition, swarms may be used for precision farming. For example, swarms can be used to search for, detect, and/or destroy insects and/or invasive plants.

Challenges with swarms of small include the need to travel long distances or to communicate long distances. These concerns apply to ground based and aerial swarms. Flying drones may not be desirable in all situations because of the noise, costs, limited travel distances, and/or adverse environmental conditions such as, for example, heavy winds, crevasses, etc. Known swarms lack the ability to communicate between swarms. In other words, while bot-to-bot communication within a swarm (i.e., intra-swarm communication) occurs in known swarms, swarm-to-swarm communications (i.e., inter-swarm communication) does not.

Examples disclosed herein provide for inter-swarm communication (e.g., communication between a bot in one swarm and a bot in a second swarm). Moreover, examples disclosed herein loosen the bond between the hardware body of a bot and the software essence of the bot, thereby enabling the software characterizing the bot to move from a bot or other host body (hardware) to another bot or other host body (hardware) either by disabling the current bot body and moving into another bot bod, or by replicating itself into new bot hardware while maintaining a copy (or the original) of the software in the original bot hardware. The software of the bot, when outside of the bot hardware (e.g., the bot body), is referred to herein as a virtual bot. A bot body is the physical hardware of the bot that may be inhabited by the software of the bot (e.g., by a virtual bot). Together, the software and body are referred to as a bot. In examples disclosed herein, bots in a swarm are, therefore, able to increase travel distances and/or communication distances by copying themselves (e.g., as a virtual bot) onto non-swarm target or host devices. For example, a bot may use a virtual partition in a host device to travel with the host device and not rely on its own physical resources. As used herein, a virtual partition is the result of a division of a computing device or resource into one or more execution environments. A storage device in a host device, for example, may be partitioned so that the bot, when copied to the host device, can operate separately from other operations of the host device. A virtual machine is another example of a partition. In examples disclosed herein, to enhance travel and/or communication range, the software of a physical, real, or actual bot copies itself into a host device as a virtual bot. After traveling a desired distance and/or accomplishing a desired task, the virtual bot can be reincarnated by moving/copying itself into the hardware of another real, physical bot and resuming execution of its instructions and/or starting execution of a different set of instructions within/via that new bot body.

Also, in examples disclosed herein, two or more swarms periodically or aperiodically communicate with one another to exchange information using, for example, one or more virtual bots. A virtual bot from a first swarm may, for example, perform such inter-swarm communication by replicating itself in a hardware bot of a second swarm.

Many physical devices and/or hardware can serve as a host device for a virtual bot including, for example, smart phones, UAVs, drones, robots, cars, other vehicles, and/or Internet of things devices. For example, in a search and rescue application, drones or other devices involved in the operation may participate as a host device. In a firefighting scenario, watering drones or firefighter equipment (e.g., a firetruck, helicopter, airplane, etc.) may serve as host devices. In a farming application, tractors, drones, and/or other equipment may serve as host devices. In these and other applications, devices may opt-in to become host devices via a subscription or other service of the customer.

FIG. 1 is a schematic illustration of an example environment 100 including a first example swarm 105 and a second example swarm 115. More than two swarms may be present. The first example swarm 105 includes a first plurality of bots 110. The second example swarm 115 includes a second plurality of bots 120. In the illustrated example, the first swarm 105 communications with the second swarm 115. Such inter-swarm communication is also referred to herein as cross-swarm communication. In some examples, the first swarm 105 and the second swarm 115 are one swarm that has been split or otherwise distributed into subparts. In such a context, examples disclosed herein enable intra-swarm communications between the subparts that would otherwise be impossible due to, for example, geographic separation of the same. The example environment 100 of FIG. 1 also includes an example first host 125, an example second host 130, and example intermediary communication equipment 135.

In the example of FIG. 1, the first swarm 105 is communicatively coupled to the second swarm 115 via a communication channel 140. The communication channel 140 enables intra-swarm communications (e.g., communication within one swarm distributed over a large geographic area) and inter-swarm communication. In some examples, the communication channel 140 leverages the resources of the intermediary communication equipment 135 which may be, for example, a base station of a cellular communication systems, satellite resources, wireless access points operating under, for example, the wi-fi protocol, etc. In other examples (e.g., where the geographic separation is not too large to prevent bot-to-bot communication), the communication channel 140 may represent direct communications between one or more of the first plurality of bots 110 in the first swarm 105 and one or more of the second plurality of bots 120 in the second swarm 115. Thus, the communication channel 140 of FIG. 1 may represent direct (bot-to-bot) communications between two swarms or two subparts of one swarm and/or indirect communications between two swarms or two subparts of one swarm using any suitable communications equipment (e.g., base station 135) and/or protocols.

The bots 110, 120 communicate over the communication channel 140 (directly and/or indirectly) to share information. For example, the bots may exchange coverage information where the first swarm 105 is covering a first geographic area and the second swarm 115 is covering a second geographic area. In some examples, the first geographic area and the second geographic area are two areas under surveillance. In other examples, the first geographic area and the second geographic area are two fields of a farm. Other examples include other types of physical locations and/or other types of end users, goals, and/or applications.

In some examples, the communication channel 140 is broken because, for example, the first plurality of bots 110 and the second plurality of bots 120 are out of communication range of each other and/or out of range of the intermediary communication equipment 135 such as, for example, a base station. For example, the first plurality of bots 110 and/or the second plurality of bots 120 may have low power radio communication equipment with short communication ranges. For example, in some environments ten or twenty meters may be a larger distance than a bot can communicate to another bot or device. Also, in some examples, one or more of the bots 110, 120 determines that the communication channel 140 has been lost or broken when the bot 110, 120 has not been able to communicate with another bot 110, 120 in its swarm 105, 115, another bot in another swarm, and/or other intermediary communication equipment 135 for a threshold amount of time such as, for example, one minute. The threshold amount of time may be predefined and/or may vary depending on circumstances such as, for example, location, applications, power availability, information from another bot, behavior from another bot, and/or emergent behavior. In other examples, the communication channel 140 may be hacked or otherwise compromised by a malicious threat or an unknown actor breaking into the intra-swarm networks of the first swarm 105 and/or the second swarm 115 and/or into the inter-swarm network of the first swarm 105 or the second swarm 115. When the communication channel 140 is broken and/or compromised, the first swarm 105 and the second swarm 115 may not be able to share information via that channel 140.

When the first swarm 105 and the second swarm 115 cannot share information via that channel 140, the first swarm 105 and/or the second swarm 115 (e.g., one or more of the bots 110, 105 of either or both of the first swarm and/or the second swarm 115) search to identify a target computing device or host that is not part of the swarms 105, 115, but has the ability (or potential) to facilitate communication between the swarms 105, 115 by hosting a virtual bot. For example, the first host 125 may be identified by one or more of the bots 110, 120 of one or more of the swarms 105, 115 as capable of carrying information (e.g., a virtual bot) to one or more of the bots 110, 120 in the other swarm 105, 115. The example environment 100 of FIG. 1 may represent bots 110, 120 that have been split into two swarms while operating on a farmland application. Depending on the swarm application, this split may or may not be desirable. In examples disclosed herein, one or more of the bots 110 in the first swarm 105 may look for a host 125 (e.g., a fast-moving car heading in the direction of the second swarm) so one or more of the bots 110 can copy itself to the host 125 as a virtual bot to be carried into a geographic location sufficiently close to communicate with one or more the bots 120 in the second swarm 115 (e.g., when the car enters communication range). As disclosed herein, the virtual bot 110 can convey information such as, for example GPS information, the status of neighboring bots, information about targets, and/or other information from the first swarm to the second swarm by communicating with one or more of the second plurality of bots 120 via the moving car or host 125. The bots 110, 120 receiving the information (e.g., in the second swarm 115) can use this information in various ways including, for example, by performing a modification of search area(s), bringing the swarms 105, 115 closer, and/or by initiating other ways to accomplish the tasks or operations assigned to the bots 110, 120. Using the car as a carrier for intra-swarm communications does not re-establish the communication channel 140, but instead provides an alternative communication path.

While it is possible for an entire swarm of virtual bots to enter a host, in some examples, a subset of the swarm 105 enters the host 125. For example, only one bot 110 may enter the host 125 as a virtual bot. To this end, any of a number of bot selection mechanisms may be employed. For example, only bots on an edge of the swarm 105 may be a candidate to enter the host 125. Such a bot may self-identify as being at an edge by recognizing it has no neighbors on a certain side. Additionally or alternatively, a first bot (or a first subset of bots) that sends a message indicating it has found a suitable host may be permitted to proceed as virtual bot(s).

Individual bots 110, 120 of the swarms 105, 115 are able to duplicate or copy themselves to the host 125 (e.g., as a virtual bot). If the host is mobile (e.g., a car, a phone traveling with and/or being carried by a person, etc.), the copied virtual bot(s) travel or progress with the host 125. In some examples, the virtual bots 110, 120 communicate over a communication channel 145 to the host 125 via an application on the host 125 to copy themselves within a virtual partition. In some examples, a virtual partition is a dedicated memory space in a processing unit (e.g., processing platform 700 of FIG. 7) of the host 125 and/or other subset of the resources of the processing platform 700 that is virtualized. Thus, for example, the virtual partition may be implemented by a virtual machine or a container executed by one or more processors of the host 125. The host 125 is a computing device such as, for example, a laptop, a tablet, an iPAD, an edge server, a smart phone, another mobile device, another add-on device, a car, etc. The host computing device may itself be mobile (e.g., a car) or may be associated with a means for transporting the host computing device. Example transporting means include a car, a person, a motorcycle, a boat, a truck, a plane, a tractor, a robot, a UAV, and/or other manned or unmanned vehicle. The virtual bot typically has no control over the direction of travel of the host 125. As such, the virtual bot may move from host to host in an effort to find its way into communication range with the second swarm 115.

In some examples, the host 125 is coupled to a network such as, for example, the Internet. In such examples, one or more of the bots 110 can copy themselves (e.g., as a virtual bot) to the host 125, copy themselves from the host to the network, and travel over the network to another host and/or another bot or swarm of bots communicatively coupled to the network to communicate with and/or further propagate themselves into the swarm. In such examples, the virtual bot(s) 110 are not restricted by the physical location or movement of the host 125.

In some examples, the virtual bot(s) 110, 120 leverage resources of the host 125. For example, many physical bots 110, 120 are simple and inexpensive devices with limited capabilities. The host 125 may often have more capabilities than the bot hardware such as, for example, one or more sensors that can be used by the virtual bot(s) 110, 120 when the virtual bot(s) 110, 120 inhabit the host 125. For instance, if a virtual bot 110 is implemented by a virtual machine in the host 125, the virtual machine may be able to access the GPS system of the host 125.

In some examples, the virtual bot 110 travels or progresses with the host 125 for a desired distance, a desired amount of time, and/or for a desired task that leverages the capabilities of the host 125. In the virtual form, the virtual bot 110 may be bound by time, location, and/or other factors such that, for example, after one or more of these factors is satisfied (e.g., is present or not present), the virtual bot 110 is to leave the host 125 by, for example, entering actual bot hardware and/or deleting itself from the host 125.

In some examples, one or more of the virtual bots 110, 120 is to send an emergency message. The capabilities of the host 125 can be leveraged to send the emergency message to any or all of a central computing device or server (e.g., a server or a virtual machine at a command center for the swarm operation, at a police station, at a firefighting company, at one or more other government agencies, etc.), to one or more other bots 110, 120, to one or more other swarms, and/or to another location, even when the communication channel 140 is broken or otherwise compromised, and/or even when the desired recipient of the emergency message is out of bot-to-bot communication range.

Also, in some examples, the entire swarm 105 copies itself to the host 125. In such examples, the entire swarm 105 in the host 125 is virtual. That is, in such examples, the swarm 105 copies itself to the virtual partition of the host 125 and travels or progresses with the host 125 for a desired distance, a desired amount of time, and/or for a desired task that leverages the capabilities of the host 125 (e.g., transportation). In the virtual formation, the virtual swarm 105 may be bound by time, location, and/or other factors such that, for example, after one or more of these factors is satisfied (e.g., is present or not present), the virtual swarm 105 leaves the host 125 by, for example, entering actual bot hardware as disclosed herein and/or deleting themselves from the host 125.

In some examples, one or more of the virtual bots 110 of the first swarm 105 carried within the virtual partition of the host 125 communicates with one or more of the bots 120 of the second swarm via a host to swarm communication channel 150. Also in some examples, the first swarm 105 can communicate with the second swarm 115 or reincarnate itself as the second swarm 115 via the host to swarm communication channel 150 such as, for example when the host 125 has moved into communication range of the second swarm 115.

In a reincarnation example, the bots 110 in the original bot hardware that form the first swarm 105 may tend to a first field in a farm or execute other instructions in other environments. The bots 110 may need to transfer to a second field of the farm, or in other examples, to a second location, but the distance is further than the physical travel (e.g., flying) capabilities of the bot hardware. In this example, the bots 110 of the first swarm 105 locate a host such as, for example, the host 125, which may be a tractor or a car. The bots 110 of the first swarm 105 copy themselves into the host 125 as virtual bots, as discussed above. In some examples, the first swarm 105 of bots 110 may continue tending the first field while the virtual bots (copies of the bots 110 of the first swarm 105) are propagated by the host 125. The virtual bots duplicate the corresponding bot software of the first swarm 105. In some examples, the original hardware of the bots 110 of the first swarm 105 return to a central location or gathering area and/or die (e.g., cease operation) after the virtual bots enter the host 125. In other examples, the original hardware bots of the first swarm 105 continue operating (e.g., on the task at the first field).

When the second field is in communication range of the host 125, the virtual bots are reincarnated into the hardware of the bots 120 of the second swarm 115 to service the second field. For example, the virtual bots write over the software included in the hardware of the bots 120 of the second swarm 115 and begin operating within that hardware. In some examples, the software included in the hardware of the bots 120 of the second swarm 115 accepts commands for being overwritten. In other examples, specific bots are included with software that accepts a reincarnated bot for particular purposes. For example, a bot may be programmed for detecting insects but may lack the capabilities being used in search and rescue. In such examples, the software on the bot can accept a copy, an image, etc. of a virtual bot from the host 125 to perform instructions related to detecting insects but would not accept a reincarnation attempt from a bot programmed to conduct search and rescue operations. In some examples, to be reincarnated, a bot must undergo an authentication process with the bot to review the virtual bot. Upon authentication, the overwrite of a virtual bot into bot hardware is permitted. In other examples, the host 125 may provide authorization needed for a bot to be reincarnated.

In some examples, there may be more virtual bots from the first swarm 105 than hardware (i.e., physical) bots 120 in the second swarm 115. In such examples, the virtual bots may be selected for reincarnation based on programming needs, bot hierarchy (e.g., a leader bot that may, for example, coordinate intra-swarm and inter-swarm communications may be reincarnated prior to a worker bot who has a relatively minor task) and/or based on a first-in, first-out schedule.

In other examples, when the transportation by the host 125 is still needed, but the host 125 is no longer available to host (e.g., the host 125 is a vehicle and the vehicle, which is not under the control of the virtual bot(s) 110, changes direction or stops traveling), the swarm 105 or one or more bots 110 of the swarm 105 can identify a second host 130 to jump to for continuing the journey. In some such examples, the virtual bots 110 use the sensing capabilities and/or other resources of the host 125 to monitor host activity. For example, the virtual bot(s) 110 can monitor GPS data gathered by the host 125 to monitor the travel path and location of the host. If the host 125 changes travel direction from the destination of the virtual bot(s), the virtual bots 110 (which do not have control over actions of the host 125) search for an alternative host heading in the correct direction. In such examples, the virtual swarm 105 or one or more virtual bots 110 copy to the second host 130 from the first host 125 via a communication channel 155. The virtual bot(s) may jump from host to host any number of times to reach its destination. In such examples, after the second (or later) host 130 reaches communication range of the second swarm 115, the virtual bot(s) 110 of the first swarm 105 carried by the second (or later) host 130 communicate with hardware of the bots 120 of the second swarm via a communication channel 160. Also in some examples, the first virtual swarm 105 can communicate with the hardware of the second swarm 115 or reincarnate itself as the second swarm 115 via the communication channel 160, such as for example, when the second host 125 reaches communication range of the second swarm 115, similar to the actions disclosed above.

Figure 2:
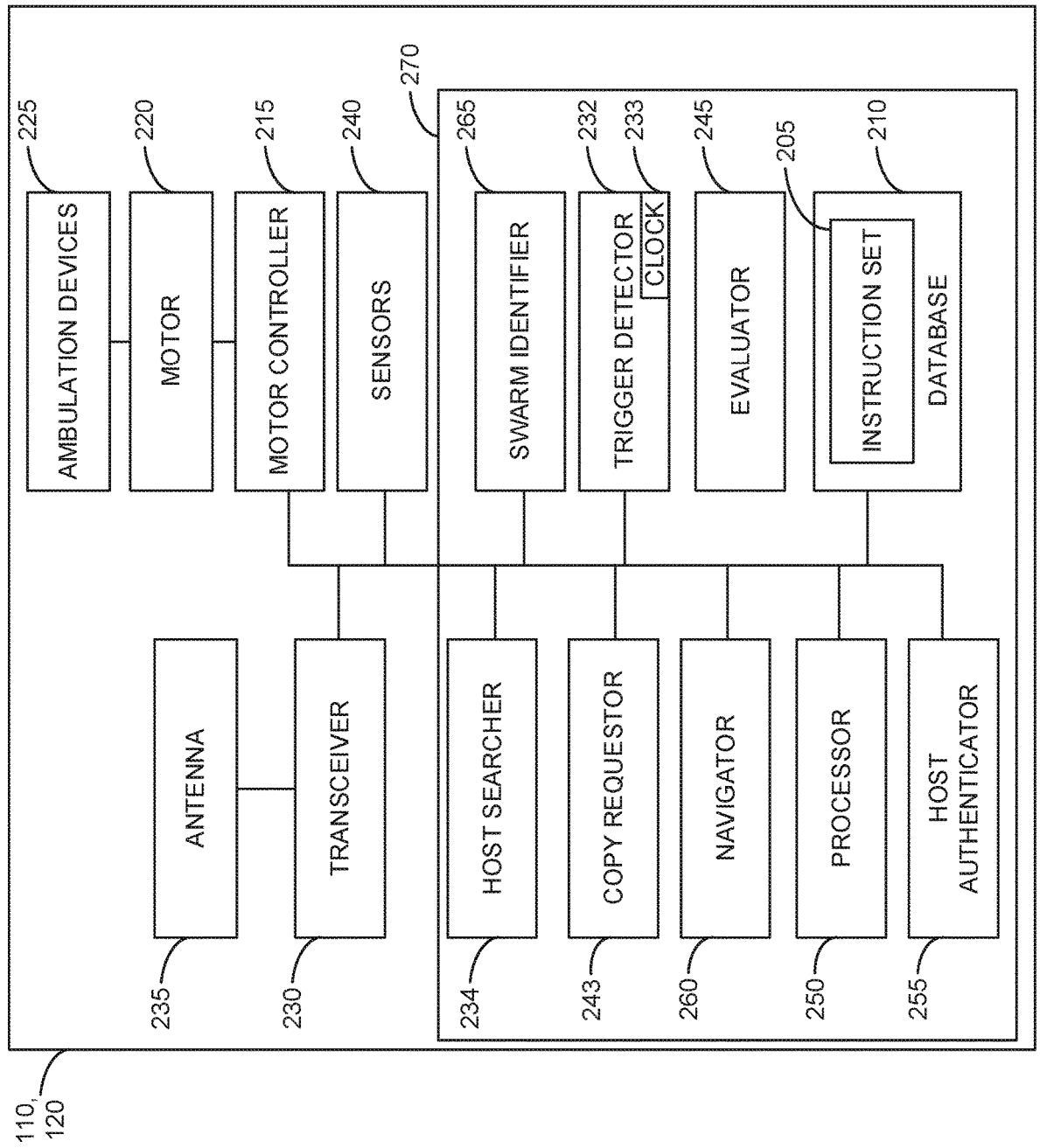
FIG. 2 is a block diagram of an example implementation of a bot of FIG. 1.

FIG. 2 is a block diagram of an example implementation of an example bot 110 of FIG. 1. The following discussion of FIG. 2 refers to one of the example bots 110, but the description equally applies to any of the example bots 110, 120. The example bot 110 includes an example instruction set 205 stored in an example database 210. The example database 210 may be implemented by any type of volatile and/or non-volatile memory, for example, as disclosed below in connection with FIG. 6. The instructions set 205 provides operating commands to the bot 110 for effecting a work order and/or performing one or more tasks. In some examples, the instruction set 205 is factory-installed into the memory of the bot. In other examples, the instruction set 205 is transmitted to the hardware bot 110 at any time prior to deployment of the hardware bot 110 for the desired operation. Some or all of the instruction set 205 implement a virtual bot as explained above. As such, the portion of the instruction set 205 corresponding to a virtual bot may be overwritten or otherwise copied into the database 210 at any time (e.g., to change a task or behavior of the bot 110).

The example bot 110 also includes means for propagating. In this example, the means for propagating is implemented by an example motor controller 215 that controls an example motor 220 to operate one or more ambulation devices 225. In the illustrated example, the bot 110 is a rotor-propelled drone. Therefore, the ambulation devices 225 are one or more rotors 225. In other examples, the motor 220 propels a fixed wing bot and the ambulation devices are a propeller. In yet other examples, the ambulation devices 225 are one or more wheels or moves one or more legs for a ground-based bot.

The example bot 110 of FIG. 2 also includes means for communicating. In this example, the means for communicating is implemented by an example transceiver, a receiver, and/or a transmitter 230 and an interface such as, for example, an antenna 235. The instruction set 205, when loaded post-manufacturing, may be communicated to the bot 110 via the antenna 235 and transceiver 230. The bot 110 can use the transceiver 230 to communicate with other bots 110 in the swarm 105 and/or bots 120 in the second swarm 115. The bot 110 can also communicate with the host 125 through the transceiver 230.

The bot 110 also includes an example trigger detector 232, which may be used to locate and/or prompt communication with a host (e.g., host 125). For example, the trigger detector 232 may detect a time condition or a sensed condition that has arisen or been triggered that causes the bot 110 to search for a host 125. Thus, in some examples, the trigger detector 232 includes a clock 233 to record and track time. There are different event types detectable by the trigger detector 232. For example, the bot 110 may have completed the job outlined in the instruction set 205, the bot 110 may have lacked communication contact with other bots 110, 120 for a threshold amount of time, the bot 110 may be low on resources including, for example, power resources, and/or the bot 110 may need to move to a position or location faster and/or farther away than the bot 110 is capable of traveling (e.g., join and/or communicate with a second swarm). In other examples, the bot 110 may search for a host (e.g., host 125) to find a fast-moving host to expand a search range as quickly as possible, and/or for other reasons for which the enhanced capabilities of a host are desired such as for example, for capabilities that the bot 110 itself cannot provide.

To assist location of candidate hosts, the example bot includes a host searcher 234. The host searcher 234 reviews broadcasts from candidate hosts received by the transceiver 230 to identify nearby hosts. The host searcher 234 can also communicate with candidate hosts. Communication between bots 110, 120 and/or hosts 125, 130 can utilize any communication technologies and/or protocols including, for example, Bluetooth, wi-fi, cellular, radio frequency, etc. In some examples, bots 110, 120 communicate using visible light signals. In some examples, bots 110, 120 communicate and transfer data through physical touching. In some examples, authentication protocols are employed for security.

Communications between the hardware bots, communications between the hardware bots and the hosts, communications between virtual bots inhabiting a host and hardware bots, and communications between virtual bots inhabiting a host and other hosts that may not currently be carrying a virtual bot can leverage the communication means disclosed herein to communicate via, for example, any of the communication channels 140, 150, 155, 160 and/or using any desired communication technologies and/or protocols. In addition, communications between virtual bots and their hosts includes for example, communications over a bus 618 as disclosed in greater detail below. In some examples, combinations of communication technologies, channels, and/or protocols may be used. In addition, as disclosed below, authentication exchanges may be used in some examples to authorize communication between components.

Figure 3:
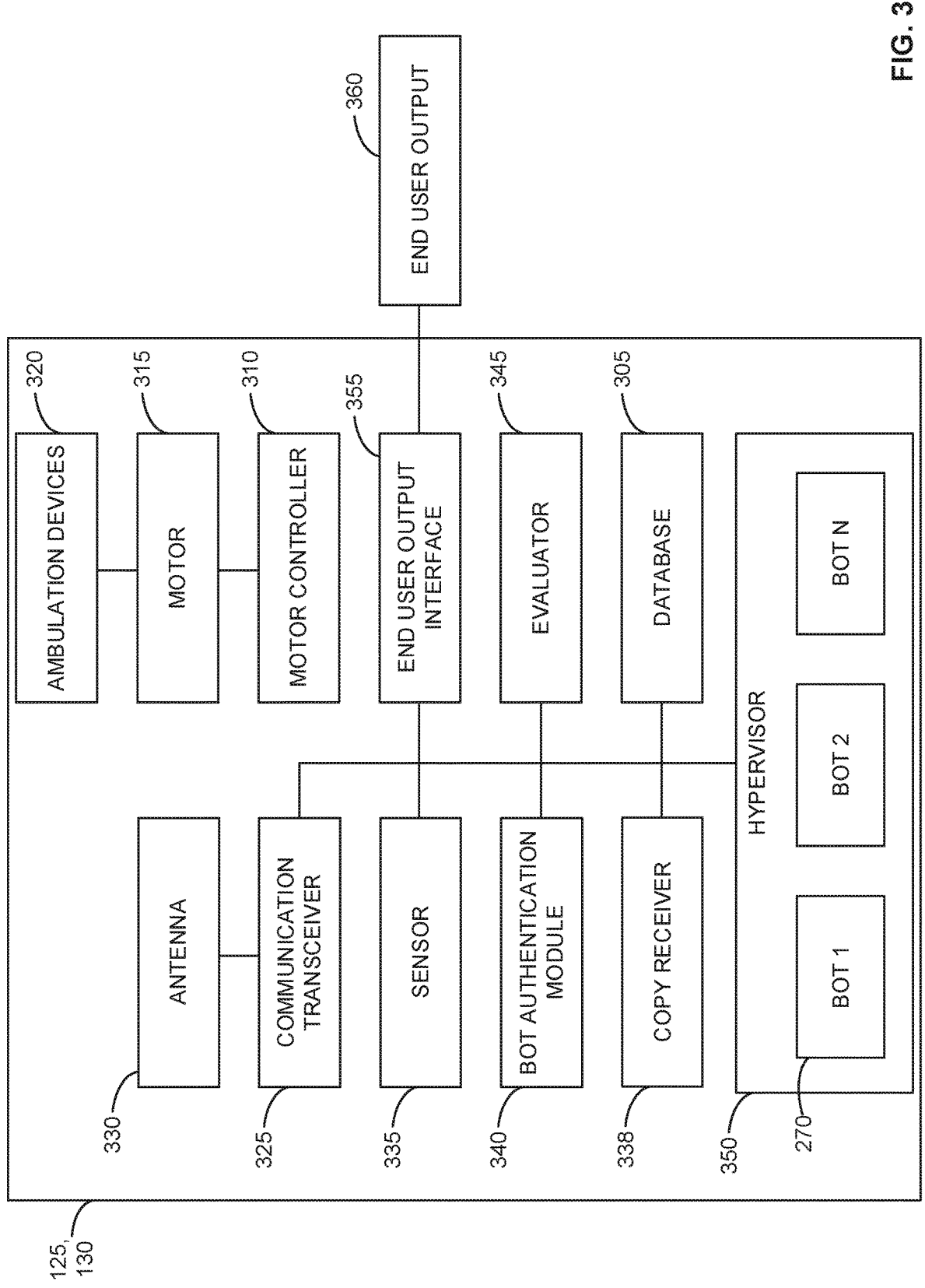
FIG. 3 is a block diagram of an example implementation of a host of FIG. 1.

FIG. 3 is a block diagram of an example implementation of an example host 125 of FIG. 1. The following discussion of FIG. 3 refers to the example host 125, but the description equally applies to any other host (e.g., the host 130). The example host 125 includes a database 305. The database 305 of the host 125 can be used for storage and retrieval of any of the data, metrics, parameters, and/or instructions disclosed herein and/or for data, metrics, parameters, and/or instructions useful for the host 125. The database 305 may be implemented by volatile and/or non-volatile memory.

The example host 125 also includes means for propagating. In this example, the means for propagating is implemented by an example motor controller 310 that controls an example motor 315 to operate example ambulation devices 320. In some examples, the ambulation devices 320 are rotors on a drone. In other examples, the ambulation devices 320 are wheels on a car. In yet other examples, the ambulation devices are other structures that can be used to propagate the host 125 from one position or location to another (e.g., rotors on a boat). Also, in some examples, the host 125 does not include the motor controller 310, the motor 315, or the ambulation devices 320 because the host 125 is embodied in a device that does not self-propel such as, for example, a mobile telephone or other mobile handheld device that is moved, for example, by being carried.

The host 125 also includes means for communicating. In this example, the means for communicating is implemented by an example transceiver, a receiver, and/or transmitter 325 and an example interface such as, for example, an antenna 330. The host 125 can communicate with the bot 110 through the transceiver 325.

When the host 125 is willing and/or available to provide hosting services, the host 125 broadcasts or advertises its availability using, for example, the transceiver 325 and antenna 330. The host 125 also communicates travel parameters including, for example, location, any planned travel paths, GPS data, speed data, travel capabilities, etc. In some examples, the host 125 broadcasts other capabilities such as sensing capabilities as disclosed in greater detail below. Also, in some examples, the host 125 broadcasts details of one or more virtual bots 110 it is carrying and possibly instructions to be completed by those bots. The details of the information advertised by the host 125 are used by the bot 110 as disclosed herein to assess the suitability of the host 125 as a transport agent.

In some examples, the host 125 is paired with a bot (e.g., bot 110) after the bot 110 sends queries to candidate hosts. The host 125 receives one or more queries through the transceiver 325, and the host 125 then responds if the host 125 is interested in, capable of, and/or available for providing hosting services.

In some examples, the host 125 is a device owned or otherwise employed by the owner or user of the bot 110 and, therefore, the host 125 is designed for and/or specifically implemented to host the bot 110. For example, a farmer may utilize one or more tractors with as one or more host devices to assist bots in a farming swarm. A fire company may utilize one or more firetrucks or one or more watering drones as one or more host devices to provide assistance to bots in an emergency situation. In other examples, a host may be a benevolent volunteer (e.g., a good Samaritan) seeking to provide assistance such as, for example, in a search and rescue scenario. In some examples, incentives are provided for candidate hosts not owned by the owner of the bot to serve as a host including, for example, financial payments.

Returning to the example of FIG. 2, the example bot 110 includes means for sensing external and/or internal data. In this example, the means for sensing is implemented by one or more example sensors 240. The host 125 also includes means for sensing external and/or internal data including one or more sensors 335. The bot 110 in some examples disclosed herein has less sensing resources than the host 125. Thus, it is advantageous for the bot 110 to inhabit the host 125 as disclosed herein to utilize the host's 125 resources including, for example, the sensing resources of the host 125 to expand the capabilities and functionality of the bot 110 when the bot 110 continues to operate after the bot 110 is copied to the host 125. A variety of sensing devices may be included in one or more of the bot 110 and/or the host 125. Some examples include one or more visual sensors such as, for example, a camera. Also, some examples include one or more audio sensors such as, for example, a microphone or array of microphones. Additionally or alternatively, in some examples, the bot 110 and/or the host 125 includes one or more other sensors including, for example, a proximity sensor, a conductance sensor, a tactile sensor, a vibration sensor, a laser-based sensor, a thermal imaging sensor, and/or other desired or suitable sensors.

The bot 110 of the example of FIG. 2 also includes means for evaluating the host 125. In this example, the means for evaluating is implemented by an example evaluator 245. As disclosed herein the evaluator 245 evaluates the parameters and/or other data broadcast by the host 125 (or returned by the host 125 in response to a request from the bot 110) to assess if the host 125 is well-suited or otherwise congruous to the needs of the bot 110. For example, the evaluator 245 determines if the travel parameters of the host 125 will bring the bot 110 to the desired location. In other examples, the evaluator 245 determines if the host 125 has sensing capabilities needed by the bot 110. For example, in a search and rescue scenario, if the host 125 does not have a thermal imaging camera, the evaluator 245 may reject the host 125 as a candidate for receipt of a copy of the bot 110. In some examples, the evaluator 245 assesses reliability of the host 125, participating history, security, and/or other factors.

The bot 110 also includes means for executing the instruction set 205. In this example, the means for executing is implemented by an example processor 250. The processor 250 is also used by the bot 110 to execute instructions needed to perform various task such as, for example, the tasks discussed herein.

The example bot 110 also includes an example copy requestor 243. When the evaluator 245 determines that the host 125 is well-suited for the bot 110, the copy requestor 243 sends a copy request from the bot 110 to the host 125 via the transceiver 230. The copy request is a communication from the bot 110 to the host 125 requesting permission for the bot 110 to be able to copy itself (e.g., to copy some or all of the software, for example the instruction set 205, of the bot 110) to the host 125 as a virtual bot to enable the bot 110 to use the resources of the host 125 and/or to be transported to a different geographic area. The host 125 includes a complementary copy receiver 338 that receives the copy request from the bot 110 for analysis as disclosed below.

To enhance the security of the systems, apparatus, and/or methods disclosed herein, the bot 110 and host 125 authenticate each other to determine if the other is a legitimate device and to reduce infiltration of malware, viruses, or other unknown entities that may be seeking to do harm. To this end, the bot 110 of FIG. 2 includes means for authenticating. In the illustrated example, the authenticating means is implemented by an example host authenticator 255. The host 125 of FIG. 3 also includes means for authenticating. In the illustrated example, the authenticating means is implemented by an example bot authenticator 340. In some examples, the host authenticator 255 and the bot authenticator 340 conduct mutual authentication using, for example, encrypted key sharing. For example, the bots 110, 120 may be assigned individual keys or a general (shared) key for the swarms 105, 115. To exchange data and mutually authenticate, the host authenticator 255 and the bot authenticator 340 perform an encrypted key handshake. Mobile ad hoc network approaches for authentication may also be applied in some examples. Also, some examples may employ blockchain technology to make the swarm more secure, autonomous, and/or flexible. Other suitable approaches to securely pair the bot 110 and the host 125 may also be used. The host authenticator 255 may also operate to authenticate bots to each other for bot-to-bot communication.

Although the hardware bot 110 has limited capabilities, the host 125 may be resource rich and, therefore, may provide additional security features including trusted execution environments, which can protect both the bot 110 and the host 125. In addition, other security features may alternatively or additionally be used. For example, an agreed or predefined encryption/decryption mechanism can be established and known to the bots in one or more swarms working within a boundary. This agreed mechanism may be nonsensical to third party agent(s) and/or prevent such third party agent(s) from accessing encrypted data. In other examples, a layer or emergency network protocol can be added to the host 125 to limit the host 125 to only being able to access the swarm emergency network of the bot 110 on an as-needed basis. In addition, due, at least in part, to the virtual partition, no other information on the host 125 or the bot 110 will be needed or accessed. In some examples, the bot 110 does not have access to any private information on the host 125.

Likewise, in some examples, the host 125 does not have access to any private information of the bot 110. Thus, there are decreased security fears with using, for example, a third party as a host 125. In addition, executing with partitions isolates the hosts 125 from each other such as, for example, when the bot 110 travels from host to host.

In some examples, the host authenticator 255 and/or the bot authenticator 340 can be used to implement updates to the bot 110 (e.g., when carried by the host 125). Such an approach ensures only authenticated updates are applied, thereby guarding against malware and the like.

The host 125 also includes means for evaluating if the host 125 would be well-suited for the bot 110. In this example, the means for evaluating is implemented by an example evaluator 345. The evaluator 345 analyzes the instruction set 205 and the copy request received by the copy receiver 338 from the bot 110 and determines if the host 125 would be helpful in execution of the instruction set 205 and performance of the task. For example, execution of the instruction set 205 and/or performance of the task may not be compatible with the host 125, the desired location may not be a location the host 125 is able to or willing to reach, the instruction set 205 may have time restrictions that the host 125 cannot meet, and/or other factors may be analyzed by the evaluator 345 and used to assess the compatibility of the bot 110 and the host 125 and to affirm or deny the request by the bot 110 to copy to the host 125. If the evaluator 345 determines that the copy request should be denied, the copy receiver 338 denies the request.

The host 125 also include means for hosting the bot 110. In this example, the means for hosting is implemented by example virtual partitioning such as that provided by the example hypervisor 350. After the evaluator 345 confirms the compatibility of the bot 110 and the host 125, the host 125 using the copy receiver 338 grants copy permission. The bot 110 copies itself into storage managed by an operating system running under the hypervisor 350 of the host 125 and, therefore, inhabits the host 125 in virtual form (e.g., as a virtual machine). In some examples, the host 125 may have a virtual machine in which the instructions of bot 110 are executed. In other examples, the bot 110 may be a virtual machine that is transferred to the host for execution. The hypervisor 350 can host N number of bots. As noted above, the entire swarm 105 can reside in virtual form on the host 125 in the hypervisor 350.

When the bot 110 inhabits the host 125, the bot 110 does not have control over the host 125. However, the virtual bot 270 can operate within a virtual machine. The virtual machine can execute the instruction set 205 and perform the tasks via resources of the host 125. In some examples, the host 125 propagates the bot 110 and, generally, the swarm 105. In some examples, the bot 270 executing in the virtual machine communicates with other bots 110, 120 and/or other swarms 115 using communication channels, links, technologies, and/or protocols disclosed above. For example, in the farming scenario bot 270 can use the resources of the host 125 to communicate what fields are complete. In the search and rescue scenario, bot 270 can use the resources of the host 125 to indicate areas searched. The bot 270 can also access further capabilities and related data such as, for example, GPS data by leveraging the enhanced functionality of the host 125 via the virtual machine 350.

In some examples, as disclosed above, the virtual machine in which the bot 110 resides can monitor the data and resources of the host 125 to determine if the host 125 is fulfilling the needs of the bot 110. For example, the bot 110 includes an example navigator 260 that monitors travel data of the virtual bot 110 and the host 125. In some examples, the navigator 260 includes mapping applications, GPS technology, and/or other software that enables the bot 110 to detect and monitor location. In other examples, the navigator 260 is structured to interact with navigation software of the host 125 to monitor location and/or movement. If the navigator 260 determines that the host 125 has changed a direction of travel or otherwise is not moving in a direction desired by the virtual bot 110, the virtual bot 110 executing in the virtual machine can use the host searcher 234 to send communications via the transceiver 325 of the host 325 to search for another host. The host searcher 234 can be implemented to search for another host for any reason (e.g., the current host 125 is no longer well-suited for the virtual bot 110).

The bot 110 of the example of FIG. 2 also includes an example swarm identifier 265. The swarm identifier 265 detects the presence of a swarm. For example, if the host 125 is to carry the virtual bot 110 from the first swarm 105 to the second swarm 115, the swarm identifier 265 can detect the second swarm 115 when the host 125 has moved into communication range with the second swarm 115. Identification of the second swarm 115 facilitates communications with the second swarm 115 and/or reincarnation of the virtual bot 110 into the hardware of a bot 120 of the second swarm 115. In some examples, the swarm identifier 265 is used to identify a single bot of a swarm. Like other aspects of the virtual bot, the swarm identifier 265 may operate within a virtual machine 270 operating on the host 125.

In some examples, the virtual machine 270 deletes the virtual bot 110 and/or the hypervisor 350 deletes the virtual machine 270 hosting the virtual bot 110 in response to certain condition(s) (e.g., completion of the tasks defined by the instruction set 205, expiration of a time, etc.). In some examples, the hypervisor 350 deletes the virtual machine after an amount of time or after the virtual bot has left the host 125.

In some examples, some or all of the motor controller 215, the trigger detector 232, the host searcher 234, the copy requestor 243, the evaluator 245, the host authenticator 255, the navigator 260, and/or the swarm identifier 265 are implemented by the processor 250 as explained in examples disclosed herein. In some examples, some or all of the motor controller 215, the trigger detector 232, the host searcher 234, the copy requestor 243, the evaluator 245, the host authenticator 255, the navigator 260, and/or the swarm identifier 265 are implemented by the instruction set and, thus, form part of the virtual bot that executes in a virtual machine on a host.

In the illustrated example, an example virtual machine 270 includes the instruction set 205, trigger detector 232, the clock 233, the host searcher 234, the copy requestor 243, the evaluator 245, the processor 250, the host authenticator 255, the navigator 260, and the swarm identifier 265. The virtual machine 270 is the virtual bot that is copied to the host 125. In other examples, additional or fewer components are included as the virtual machine 270. For example, the virtual machine 270 and, thus, the virtual bot may include only the instruction set 205.

The host 125 also includes an end user output interface 355 that is communicatively coupled to an end user output 360. The end user output 360 include visual, audio, and/or tactile output to an operator of the host 125. In some examples, the end user output 360 is incorporated with the host 125. In other examples, the end user output 360 is a separate device from the host 125. For example, the end user output 360 may include a display screen, a wearable display, output in both virtual reality and actual reality, audio signals, video signals, haptics, etc. The end user output 360 can present information related to the execution of the instruction set 205 and/or performance of the task by the host 125, the resources leveraged by the bot 110, the granting or denial of copy requests, timing, distance, and/or other information related to the performance of the hosting services.

In some examples, the motor controller 310, the copy receiver 338, the bot authenticator 340, the evaluator 345, and/or the end user output interface 355 are implemented by a processor such as disclosed below with FIG. 7.

Though one host 125 is shown in FIG. 3 and two hosts 125, 130 are shown in FIG. 1, and (N) number of hosts may be involved with the operation of one or more of the bots 110, 120 in one or more of the swarms 105, 115. Also, in some examples, limits are imposed to avoid overwhelming the host 125 in communication and processing tasks. For example, the instruction set 205 may include self-limiting aspects bound by, for example, time, a number of copies a bot can generate, a number of copies a host can accept, how copies are managed, and/or other restrictions. In some examples, a virtual bot is only permitted to jump up to a fixed number (e.g., two, three, ten, etc.) before being deleted.

While an example manner of implementing the example bot 110, the example bot 120, the example host 125, and the example host 130 of FIG. 1 is illustrated in FIGS. 2 and 3, one or more of the elements, processes and/or devices illustrated in FIGS. 2 and 3 may be combined, divided, re-arranged, omitted, eliminated and/or implemented in any other way. Further, the example instruction set 205, the example database 210, the example motor controller 215, the example transceiver 230, the example trigger detector 232, the example clock 233, the example host searcher 234, the example sensors 240, the example copy requestor 243, the example evaluator 245, the example processor 250, the example host authenticator 255, the example navigator 260, the example swarm identifier 265, the example virtual machine 270, the example database 305, the example motor controller 310, the example transceiver 325, the example sensors 335, the example copy receiver 338, the example bot authenticator 340, the example evaluator 345, the example hypervisor 350, the example end user output interface 355, the example end user output 360 and/or, more generally, the example bot 110, the example bot 120, the example host 125, and/or the example host 130 of FIGS. 1-3 may be implemented by hardware, software, firmware and/or any combination of hardware, software and/or firmware. Thus, for example, any of the example instruction set 205, the example database 210, the example motor controller 215, the example transceiver 230, the example trigger detector 232, the example clock 233, the example host searcher 234, the example sensors 240, the example copy requestor 243, the example evaluator 245, the example processor 250, the example host authenticator 255, the example navigator 260, the example swarm identifier 265, the example virtual machine 270, the example database 305, the example motor controller 310, the example transceiver 325, the example sensors 335, the example copy receiver 338, the example bot authenticator 340, the example evaluator 345, the example hypervisor 350, the example end user output interface 355, the example end user output 360 and/or, more generally, the example bot 110, the example bot 120, the example host 125, and/or the example host 130 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, instruction set 205, the example database 210, the example motor controller 215, the example transceiver 230, the example trigger detector 232, the example clock 233, the example host searcher 234, the example sensors 240, the example copy requestor 243, the example evaluator 245, the example processor 250, the example host authenticator 255, the example navigator 260, the example swarm identifier 265, the example virtual machine 270, the example database 305, the example motor controller 310, the example transceiver 325, the example sensors 335, the example copy receiver 338, the example bot authenticator 340, the example evaluator 345, the example hypervisor 350, the example end user output interface 355, the example end user output 360, the example bot 110, the example bot 120, the example host 125, and/or the example host 130 are hereby expressly defined to include a non-transitory computer readable storage device or storage disk such as a memory, a digital versatile disk (DVD), a compact disk (CD), a Blu-ray disk, etc. including the software and/or firmware. Further still, the example bot 110, the example bot 120, the example host 125, and the example host 130 of FIG. 1 may include one or more elements, processes and/or devices in addition to, or instead of, those illustrated in FIGS. 2 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
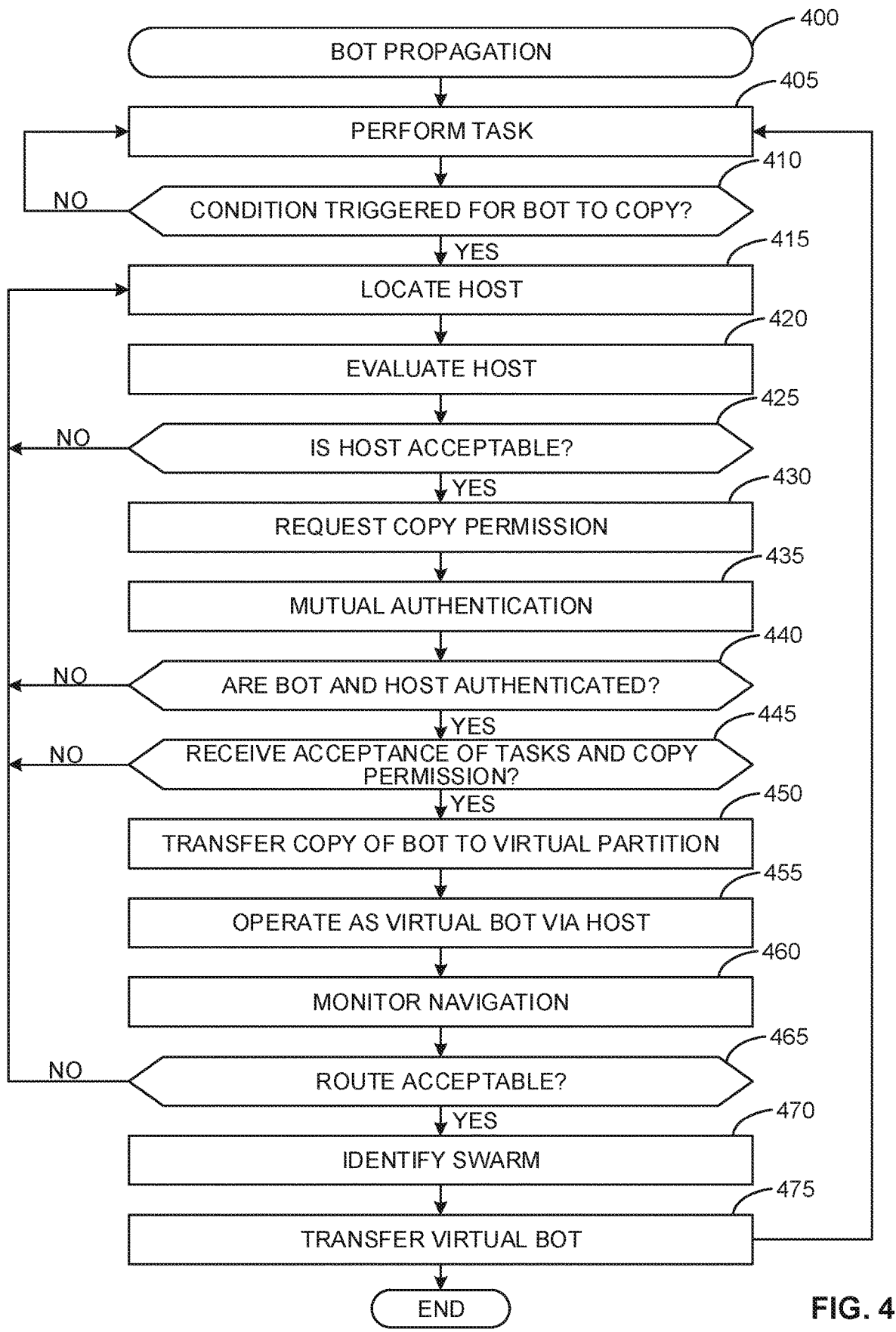
FIG. 4 is a flow chart representative of example machine readable instructions that may be executed by one or more processors to implement the example bot of FIGS. 1 and 2.
Figure 5:
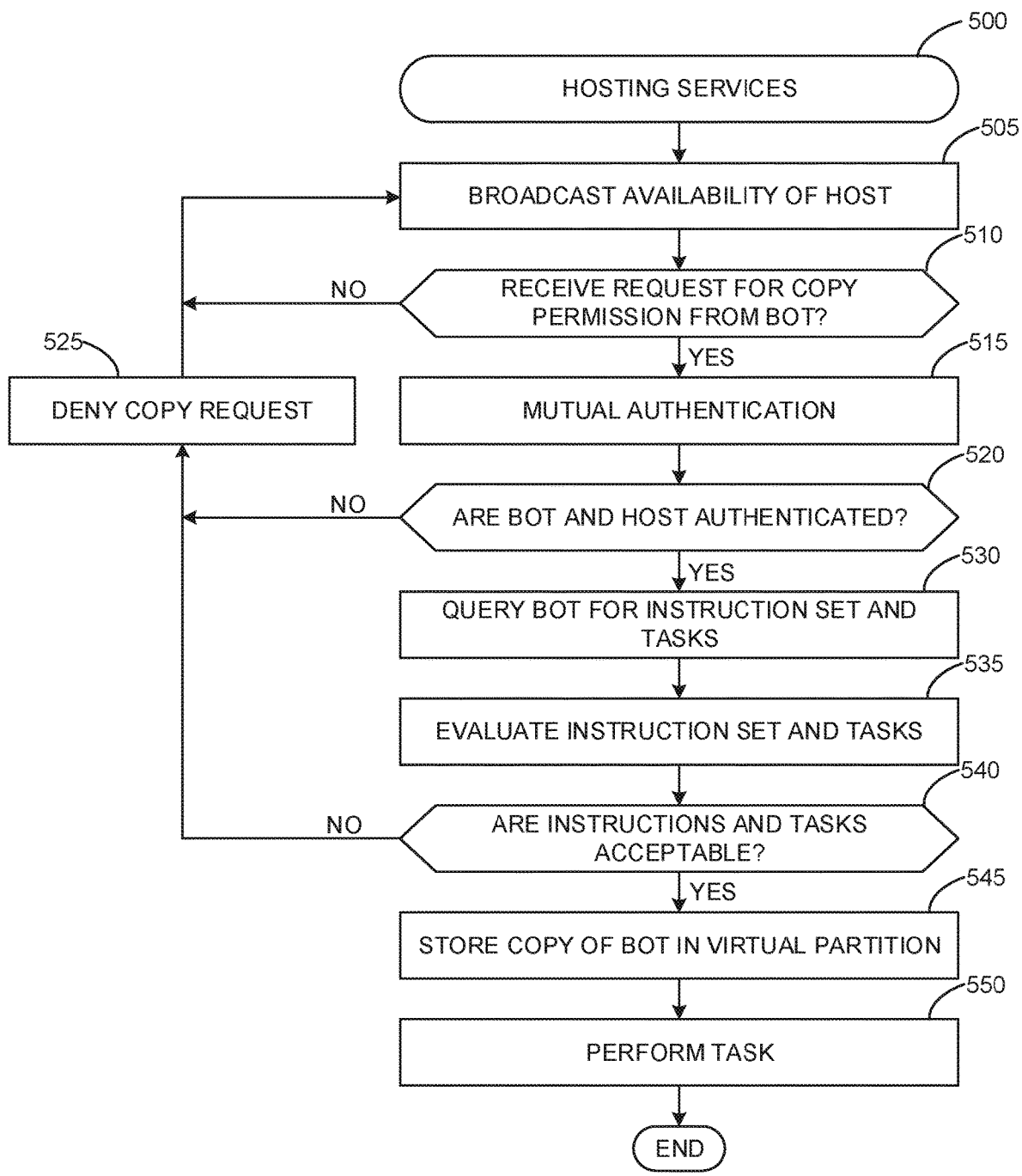
FIG. 5 is a flow chart representative of example machine readable instructions that may be executed by one or more processors to implement the example host of FIGS. 1 and 3.

A flowchart representative of example hardware logic or machine readable instructions for implementing the example bot 110, 120 of FIGS. 1 and 2 for swarm propagation using virtual partitions is shown in FIG. 4, and a flowchart representative of example hardware logic or machine readable instructions for implementing the example host 125, 130 of FIGS. 1 and 3 for swarm propagation using virtual partitions is shown in FIG. 5. The machine readable instructions may be a program or portion of a program for execution by a processor such as the processor 612 shown in the example processor platform 600 discussed below in connection with FIG. 6 and/or the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 612 or the processor 712, but the entire program and/or parts thereof could alternatively be executed by a device other than the processor 612 or the processor 712 and/or embodied in firmware or dedicated hardware. Further, although the example program is described with reference to the flowcharts illustrated in FIGS. 4 and 5, many other methods of implementing the example bot 110, the example bot 120, the example host 125, and the example host 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program 400 of FIG. 4 is representative of the instruction set 205. Over the course of FIG. 4, a bot 110 is propagated from a first swarm toward a second swarm. Initially, the bot 110 is deployed in the environment 100 of FIG. 1 to execute a certain task (e.g., perform a search mission). For example, the bot 110 can be deployed to a farm where the bot 110 searches for, detects, and/or destroys invasive plants. In other examples, the bot 110 can be deployed to an environment to perform other tasks such as, for example, gather ground-based data, gather weather data, perform search and rescue operations, etc. While performing the task (block 405), the transceiver 230 and antenna 235 of the bot 110 share data and other information with neighboring bots. Thus, developing emergent behavior as explained above.

At block 410, the trigger detector 232 determines if a time-based condition or a sensed condition has been met or triggered to cause the bot 110 to search for a host to which the bot 110 should copy (block 410). For example, the bot 110 may be low on resources such as power, the bot 110 may need the resources of a host to complete a task, the bot 110 may have gone a threshold amount of time without communicating with other bots, the bot 110 may not be able to reach the second swarm 115, and/or other conditions as disclosed herein.

If a condition has not been triggered (block 410) for the bot 110 to copy to a host, the processor 250 of the bot 110 continues to perform the task (block 405). If a condition has been triggered for the bot 110 to copy to a host 125 (block 410), a host searcher 234 locates a host with which the bot 110 can communicate such as, for example, the host 125

(block 415). In some examples, the host 125 is locatable by the host searcher 234 because the host 125 broadcasts or otherwise advertises the ability or willingness of the host 125 to receive a copy or host the bot 110 as disclosed herein.

The evaluator 245 of the bot 110 evaluates the host 125 to determine if the host 125 is well-suited for the needs of the bot 110 (block 420). For example, the evaluator 245 can assess the direction of travel, the speed of travel, other travel parameters, the sensing capabilities, and/or other resources or usage history of the host 125 to determine if the host 125 can provide the services needed by the bot 110. If the evaluator 245 determines that the host 125 is not acceptable (block 425), the host searcher 234 continues to locate other hosts (block 415). If the host 125 is well-suited for the needs of the bot 110, the evaluator 245 determines that the host 125 is acceptable (block 425). With an acceptable host identified, the bot 110 communicates with the host 125 via the antenna 235 and transceiver 230 and the copy requestor 243 requests copy permission to copy itself (i.e., send a copy of the virtual bot) to the host 125 (block 430).

When the copy requestor 243 has requested permission to copy to the host 125 (block 430), the host authenticator 255 of the bot 110 and the bot authenticator 340 of the host 125 perform a mutual authentication (block 440) using, for example, an encrypted handshake and/or other suitable security measures including any disclosed herein. If either or both the host authenticator 255 of the bot 110 and the bot authenticator 340 of the host 125 determines that the bot 110 and/or host 125 cannot be authenticated (block 440), the host searcher 234 continues to locate other hosts (block 415). If both the host authenticator 255 of the bot 110 and the bot authenticator 340 of the host 125 authenticate the other of the host authenticator 255 of the bot 110 and the bot authenticator 340 of the host 125 (block 440), the copy requestor 243 waits for the host 125 to review the tasks to be performed by the bot 110 (as disclosed herein and with respect to FIG. 5) and for receipt of acceptance of the tasks and copy permission (block 445).

If the copy requestor 243 does not receive acceptance of the tasks by the host 125 and/or other indication that permission to copy the bot 110 to the host 125 is granted (block 445), the host searcher 234 continues to locate other hosts (block 415). If the copy requestor 243 receives acceptance of the instructions and permission to copy from the host 125 (block 445), the processor 250 transfers a copy of the virtual bot (i.e., the virtual machine 270) via the transceiver 230 to a virtual partition in the host, for example, in the hypervisor 350 (block 450).

With the virtual bot 110 carried by the host 125, the virtual bot 110 operates to perform the tasks through the host 125 (block 455). In some examples, the processor 250 of the bot 110 is used to perform the tasks using sensing and/or processing resources of the host 125.

The navigator 260 monitors travel data (block 460) to ensure that the virtual bot 110 is propagated as expected. If the navigator 260 determines that the route of travel is not acceptable (block 465) because, for example, the host 1125 has changed the path of travel or ceased traveling, the host searcher 234 searches for another suitable host (block 415). If the navigator 260 determines that the route is acceptable (block 465), the virtual bot 110 continues to travel in the host 125 until the swarm identifier 265 identifies one or more bots 120 in the second swarm (block 470). For example, when the host 125 enters communication range of the second swarm, the swarm identifier 265 detects the presence of one or more of the bots 120 of the second swarm 115. When the second swarm 115 is identified, the processor 250 transfers the virtual bot 110 to the hardware of a bot 120 in the second swarm 115. In some examples, the example program 400 ends after the bot has been propagated to the second swarm 115. In other examples, the program 400 continues with performance of the task (block 405).

The program 500 of FIG. 5 is representative of instructions to execute hosting services by the host 125. The program 500 of FIG. 5 includes the transceiver of the host 125 broadcasting the availability of the host 125 to serve as a host to one or more bots 110 and/or the swarm 105 (block 505). For example, the transceiver 325 broadcasts the current or planned direction of travel of the host 125, the current or planned speed of travel of the host 125, other current or planned travel parameters or capabilities, the sensing capabilities, and/or other resources or usage history of the host 125.

The copy receiver 338 determines if a request for copy permission from a bot 110 has been received (block 510). After, for example, the evaluator 245 of the bot 110 evaluates the host 125 to determine if the host 125 is well-suited for the needs of the bot 110, the copy requestor 243 requests copy permission to copy the virtual bot to the host 125. If the copy receiver 338 has not received a request for copy permission (block 510), the transceiver 325 continues to broadcast the availability of the host 125 to provide hosting services (block 505).

When the copy receiver 338 has received a request for copy permission (block 510), the host authenticator 255 of the bot 110 and the bot authenticator 340 of the host 125 perform a mutual authentication (block 515) using, for example, an encrypted handshake and/or other suitable security measures including any disclosed herein. If either or both the host authenticator 255 of the bot 110 and the bot authenticator 340 of the host 125 determines that the bot 110 and/or host 125 cannot be authenticated (block 520), the copy receiver 338 denies the request for copy permission (block 525), and the transceiver 325 continues to broadcast the availability of the host 125 to provide hosting services (block 505). If both the host authenticator 255 of the bot 110 and the bot authenticator 340 of the host 125 authenticate the other of the host authenticator 255 of the bot 110 and the bot authenticator 340 of the host 125 (block 520), the evaluator 345 of the host 125 queries the bot 110 for the instruction set 205 and the tasks to be performed by the bot 110 (block 530).

The evaluator 345 of the host 125 reviews and evaluates the instruction set 205 and the tasks to identify the needs of the bot 110 (block 535). For example, the evaluator 345 reviews the instruction set 205 and tasks to identify where the bot 110 wants to travel, what sensing data the bot 110 wants to gather, what time restrictions the bot 110 has, and/or other activity and/or data detailed in the instruction set 205.

The evaluator 345 determines if the instruction set 205 and tasks are acceptable to the host 125 (block 540). For example, the evaluator 345 determines if the host 125 has the sensors needed to provide the data the bot 110 requires. In other examples, the evaluator 345 determines if the host 125 is traveling in the direction and/or at the speed the bot 110 requires. In some examples, the evaluator 345 determines if the host 125 can or will operate for a sufficient duration of time to meet the needs of the bot 110. If the evaluator 345 determines that the instruction set 205 and tasks are not acceptable (block 540), the copy receiver 338 denies the request for copy permission (block 525), and the transceiver 325 continues to broadcast the availability of the host 125 to provide hosting services (block 505).

If the evaluator 345 determines that the instruction set 205 and tasks are acceptable (block 540), the copy receiver 338 accepts the copy request from the bot 110, and the hypervisor 350 provides an interface for executing a copy of the virtual bot 110 (i.e., the virtual machine 270) in a virtual partition (block 545). With the virtual bot 110 carried by the host 125, the processor 250 of the virtual bot 110 carried by the host 125 performs the task (block 550) as the virtual bot 110 operates through the host 125. In some examples. The example program of hosting services ends 500 after the performance of the task. In some examples, the bot 110 is transferred from the host 125 to another host or another bot by actions of the bot 110. Additionally or alternatively, in some examples, the processor 250 deletes the bot 110 from the host 125.

Figure 6:
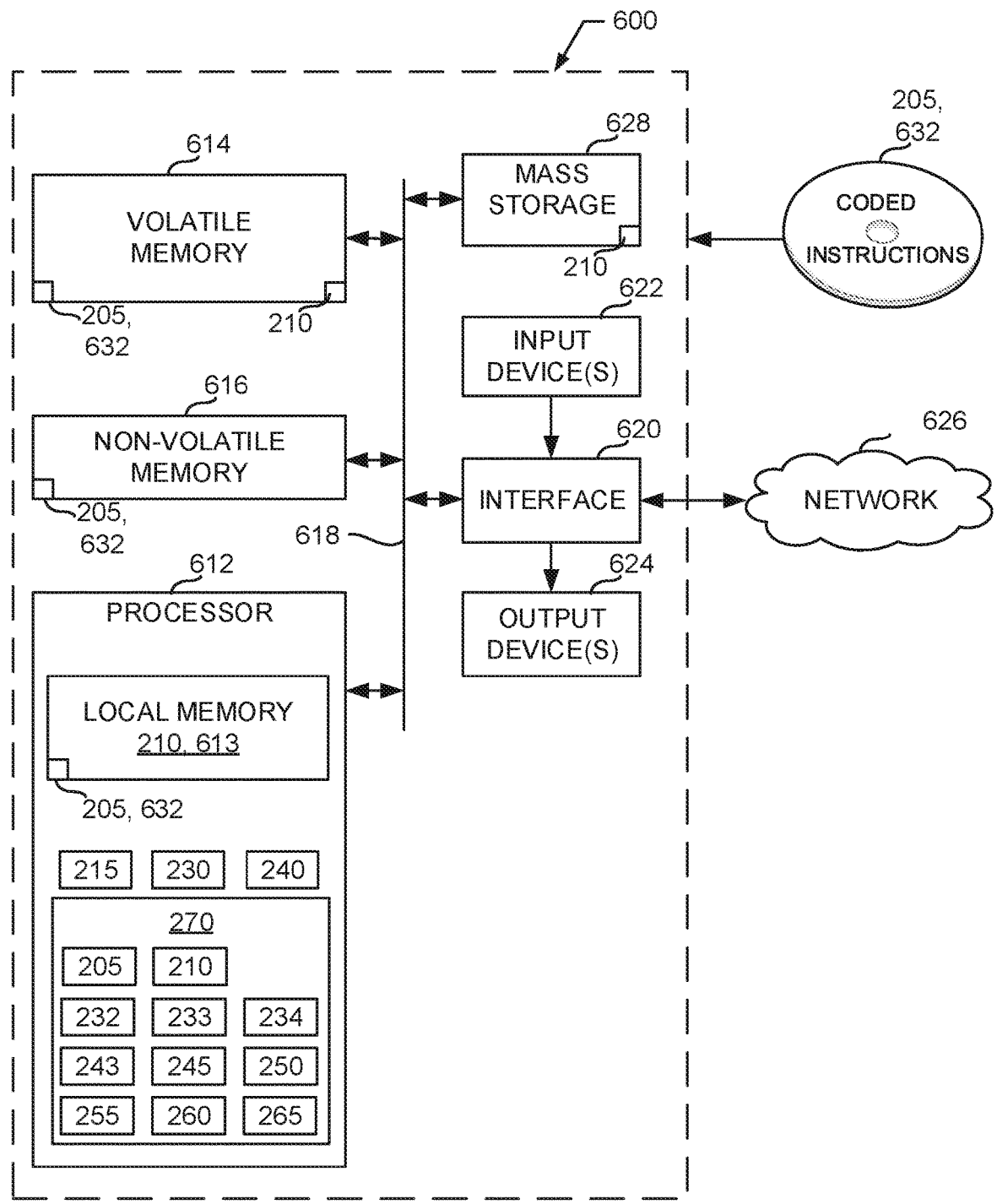
FIG. 6 is a block diagram of an example processor platform structured to execute the example machine readable instructions of FIG. 4 to implement the example bot of FIGS. 1 and 2.

FIG. 6 is a block diagram of an example processor platform 500 structured to execute the instructions of FIG. 4 to implement the example bot 110, 120 of FIGS. 1 and 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements one or more of or at least a portion of one or more of the example instruction set 205, the example motor controller 215, the example transceiver 230, the example trigger detector 232, the example clock 233, the example host searcher 234, the example sensors 240, the example copy requestor 243, the example evaluator 245, the example processor 250, the example host authenticator 255, the example navigator 260, the example swarm identifier 265, and the example the virtual machine 270.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 205, 632 of FIG. 4 may be stored in the mass storage device 628, in the volatile memory 614, in the non-volatile memory 616, and/or on a removable non-transitory computer readable storage medium such as a CD or DVD.

Figure 7:
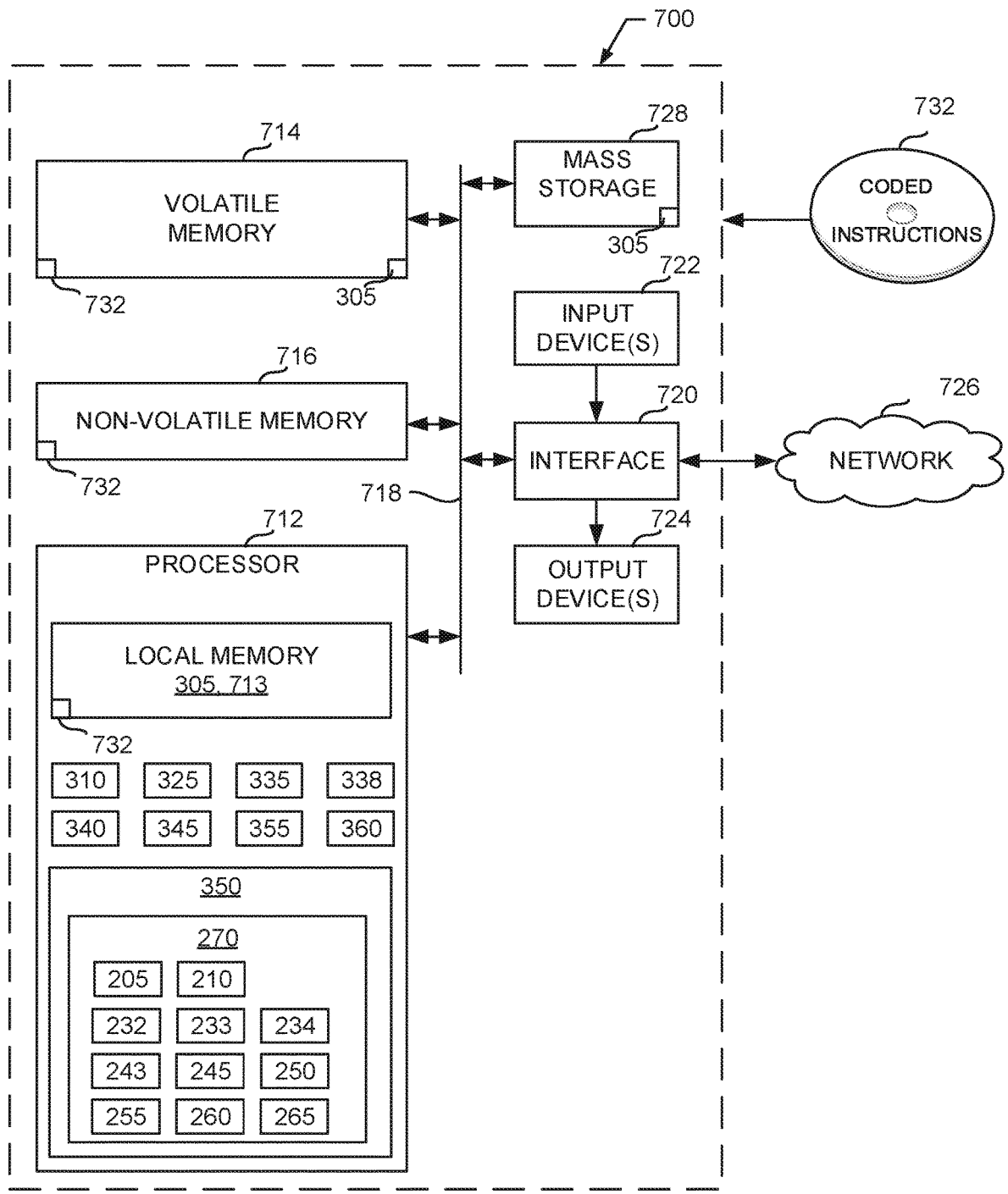
FIG. 7 is a block diagram of an example processor platform structured to execute the example machine readable instructions of FIG. 5 to implement the example host of FIGS. 1 and 3.

FIG. 7 is a block diagram of an example processor platform 700 structured to execute the instructions of FIG. 5 to implement the example the example host 125, 130 of FIGS. 1 and 3. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements one or more of or at least a portion of one or more of the example instruction set 205, the example motor controller 215, the example transceiver 230, the example trigger detector 232, the example clock 233, the example host searcher 234, the example sensors 240, the example copy requestor 243, the example evaluator 245, the example processor 250, the example host authenticator 255, the example navigator 260, the example swarm identifier 265, the example virtual machine 270, the example motor controller 310, the example transceiver 325, the example sensors 335, the example copy receiver 338, the example bot authenticator 340, the example evaluator 345, the example hypervisor 350, the example end user output interface 355, and the example end user output 360.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 5 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed for robot swarm propagation using virtual partitions. The example disclosed herein advance the capabilities and operation of bots and, particularly, swarms of bots. Swarms of bots typically have no central control and the individual bots have limited capabilities including, for example, low power radio communications and short range operation and communications. In addition, current swarm robotics lack cross-swarm communications. Current swarms often experience failure in swarm propagation. The examples disclosed herein enable the bots and the swarms of bots to act more dynamically while maintaining the bots to limited and inexpensive hardware configurations. Without the need for central processing or control, the bots disclosed herein are able to identify and communicate with hosts and copy themselves to the hosts to expand the processing, communications, and/or operational capabilities of the bots by leveraging the capabilities of the host. In some examples, the host capabilities enable cross-swarm communications and facilitate swarm propagation.

The examples disclosed herein are also an advancement and beneficial over known module post hoc networks or self-assembling networks. For example, the virtual bots disclosed herein a real-time and opportunistic, and the bots will complete tasks detailed in the instruction set without local control decisions, without pre-defined decisions, and without the need for long-distance connectivity beyond communication with a neighboring bot or nearby host. In addition, the swarms disclosed herein a highly scalable without the need for additional central instructions.

Also, in some examples, the swarms can become separate from the hardware. In such examples, the swarm may be more valuable or more able to successfully complete a mission because one or more members of the swarm can take over the hardware of an existing swarm.

In some examples, the swarms can be preserved to avoid destructive external forces. For example, in a flood or a fire, the swarms can hibernate in one or more hosts that can escape the adverse environmental conditions so that the missions (for example, the instruction set) are not lost if the physical bots are destroyed. The virtual versions of the bots continue to exist and can be propagated and/or reincarnated as disclosed herein.

Example methods, apparatus, systems and articles of manufacture for robot swarm propagation using virtual partitions are disclosed herein. Different aspects of the examples disclosed herein can be combined in other examples. Further examples and combinations thereof include the following.

Example 1 is an apparatus to propagate a swarm of robots. The apparatus of Example 1 includes a transceiver to broadcast the availability of the apparatus to host one or more bots in a swarm of robots and to receive a copy request from a bot in the swarm of robots. The apparatus of Example 1 also includes an evaluator to evaluate instructions from the bot and determine if the apparatus is equipped to propagate the bot, and a virtual partition to provide an interface for executing a copy of the bot.

Example 2 includes the apparatus of Example 1, wherein the copy of the bot includes a processor to execute the instructions of the bot.

Example 3 includes the apparatus of Example 2, wherein the copy of the bot is to delete the copy of the bot from the hypervisor after execution of the instructions.

Example 4 includes the apparatus of Example 2, wherein the copy of the bot is to delete the copy of the bot from the hypervisor after an amount of time.

Example 5 includes the apparatus of any of Examples 1-4, further including a sensor to provide sensing resources for the bot.

Example 6 includes the apparatus of any of Examples 1-4, further including an authenticator to authenticate the bot.

Example 7 includes the apparatus of any of Examples 1-4, wherein the bot is a first bot, the transceiver is to receive a copy request from a second bot in the swarm of robots, and the virtual partition to provide an interface for executing a copy of the second bot.

Example 8 includes the apparatus of any of Examples 1-4, wherein the bot is a first bot, the swarm of robots is a first swarm of robots, the transceiver is to receive a copy request from a second bot in a second swarm of robots, the evaluator is to evaluate instructions from the second bot and determine if the apparatus is equipped to propagate the second bot, and the virtual partition to provide an interface for executing a copy of the second bot.

Example 9 includes the apparatus of any of Examples 1-4, wherein the virtual partition to provide an interface for executing a copy of a plurality of bots in the swarm.

Example 10 includes the apparatus of any of Examples 1-4, wherein the evaluator is to determine if the apparatus is equipped to propagate the bot based on a travel parameter.

Example 11 is an apparatus to propagate a swarm of robots. The apparatus of Example 11 includes means for communicating the availability of the apparatus to host one or more bots in a swarm of robots and for receiving a copy request from a bot in the swarm of robots. Example 11 also includes means for evaluating instructions from the bot and determine if the apparatus is equipped to propagate the bot, and means for hosting a virtual version of the bot.

Example 12 includes the apparatus of Example 11, wherein the virtual version of the bot includes means for executing the instructions of the bot.

Example 13 includes the apparatus of Example 12, wherein the means for executing is to delete the virtual version of the bot from after execution of the instructions.

Example 14 includes the apparatus of Example 12, wherein the means for executing is to delete the virtual version of the bot after an amount of time.

Example 15 includes the apparatus of any of Examples 11-14, further including means for providing sensing resources for the bot.

Example 16 includes the apparatus of any of Examples 11-14, further including means for authenticating the bot.

Example 17 includes the apparatus of any of Examples 11-14, wherein the bot is a first bot, the means for communicating is to receive a copy request from a second bot in the swarm of robots, and the means for hosting is to host a virtual version of the second bot.

Example 18 includes the apparatus of any of Examples 11-14, wherein the bot is a first bot, the swarm of robots is a first swarm of robots, the means for communicating is to receive a copy request from a second bot in a second swarm of robots, the means for evaluating is to evaluate instructions from the second bot and determine if the apparatus is equipped to propagate the second bot, and the means for hosting is to host a virtual version of the second bot.

Example 19 includes the apparatus of any of Examples 11-14, wherein the means for hosting is to host a virtual version of a plurality of bots in the swarm.

Example 20 includes the apparatus of any of Examples 11-14, wherein the means for evaluating means is to determine if the apparatus is equipped to propagate the bot based on a travel parameter.

Example 21 is a non-transitory computer readable storage medium comprising computer readable instructions that, when executed, cause one or more processors to at least broadcast the availability of a host device to host one or more bots from a swarm of robots and receive a copy request from a bot in the swarm of robots. The instructions of Example 21 also cause one or more processors to perform an evaluation of operation commands from the bot, determine if the host device is equipped to propagate the bot based on the evaluation, and provide an interface for executing a virtual copy of the bot when the host device is equipped to propagate the bot.

Example 22 includes the storage medium of Example 21, wherein the instructions further cause the one or more processors to execute the operation commands of the bot.

Example 23 includes the storage medium of Example 22, wherein the instructions further cause the one or more processors to delete the copy of the bot after execution of the operation commands.

Example 24 includes the storage medium of Example 22, wherein the instructions further cause the one or more processors to delete the copy of the bot after an amount of time.

Example 25 includes the storage medium of any of Examples 21-24, wherein the instructions further cause the one or more processors to operate a sensor to provide sensing resources for the bot.

Example 26 includes the storage medium of any of Examples 21-24, wherein the instructions further cause the one or more processors to authenticate the bot.

Example 27 includes the storage medium of any of Examples 21-24, wherein the bot is a first bot, and the instructions further cause the one or more processors to receive a copy request from a second bot in the swarm of robots, and provide an interface for executing a virtual a copy of the second bot.

Example 28 includes the storage medium of any of Examples 21-24, wherein the bot is a first bot, the swarm of robots is a first swarm of robots, and the instructions further cause the one or more processors to receive a copy request from a second bot in a second swarm of robots, perform an evaluation of operation commands from the second bot, determine if the host is equipped to propagate the second bot based on the evaluation, and provide an interface for executing a virtual a copy of the second bot.

Example 29 includes the storage medium of any of Examples 21-24, wherein the instructions further cause the one or more processors to provide an interface for executing a virtual a copy of a plurality of bots in the swarm.

Example 30 includes the storage medium of any of Examples 21-24, wherein the instructions further cause the one or more processors to determine if the host is equipped to propagate the bot based on a travel parameter.

Example 31 is a method to propagate a swarm of robots. The method of Example 31 includes broadcasting the availability of a host to host one or more bots from swarm of robots and receiving a copy request from a bot in the swarm of robots. The method of Example 31 also includes evaluating instructions from the bot, determining if the host is equipped to propagate the bot, and providing an interface for executing a virtual a copy of the bot.

Example 32 includes the method of Example 31, further including executing the instructions of the bot.

Example 33 includes the method of Example 32, further including deleting the copy of the bot after execution of the instructions.

Example 34 includes the method of Example 32, further including deleting the copy of the bot after an amount of time.

Example 35 includes the method of any of Examples 31-34, further including providing sensing resources for the bot.

Example 36 includes the method of any of Examples 31-34, further including authenticating the bot.

Example 37 includes the method of any of Examples 31-34, wherein the bot is a first bot, the method further including receiving a copy request from a second bot in the swarm of robots, and providing an interface for executing a copy of the second bot.

Example 38 includes the method of any of Examples 31-34, wherein the bot is a first bot and the swarm of robots is a first swarm of robots, the method further including receiving a copy request from a second bot in a second swarm of robots, evaluating instructions from the second bot, determining if the host is equipped to propagate the second bot, and providing an interface for executing a copy of the second bot.

Example 39 includes the method of any of Examples 31-34, further including providing an interface for executing a copy of a plurality of bots in the swarm.

Example 40 includes the method of any of Examples 31-34, wherein the determining if the host is equipped to propagate the bot is based on a travel parameter.

Example 41 is an apparatus for propagating a swarm of bots. The apparatus of Example 41 includes a detector to sense an event for locating a host device, a transceiver to receive a broadcast message from the host device, an evaluator to evaluate the broadcast message and determine if the host device is equipped to propagate the apparatus, and a virtual machine to be transferred to the host device if the host device is equipped to propagate the apparatus.

Example 42 includes the apparatus of Example 41, wherein the event is based on a resource of the apparatus.

Example 43 includes the apparatus of Example 41, wherein the event is based on a location of the apparatus.

Example 44 includes the apparatus of Example 41, wherein the event is based on a communication history of the apparatus.

Example 45 includes the apparatus of Example 41, wherein the broadcast message includes a travel parameter of the host device.

Example 46 includes the apparatus of and of Examples 41-45, wherein the swarm is a first swarm, the apparatus further including a swarm identifier to identify a presence of a bot in a second swarm, the virtual machine to be copied from the host device to the bot based on the presence.

Example 47 is an apparatus to propagate a swarm of robots. The apparatus of Example 47 includes means for sensing an event for locating a host device, means for receiving a broadcast message from the host device, means for evaluating the broadcast message and determine if the host device is equipped to propagate the apparatus, and means for hosting a virtual copy of the apparatus to the host device if the host device is equipped to propagate the apparatus.

Example 48 includes the apparatus of Example 47, wherein the event is based on a resource of the apparatus.

Example 49 includes the apparatus of Example 47, wherein the event is based on a location of the apparatus.

Example 50 includes the apparatus of Example 47, wherein the event is based on a communication history of the apparatus.

Example 51 includes the apparatus of Example 47, wherein the broadcast message includes a travel parameter of the host device.

Example 52 includes the apparatus of any of Examples 47-51, wherein the swarm is a first swarm, the apparatus further including means for identifying a presence of a bot in a second swarm, the virtual copy of the apparatus to be copied from the host device to the bot based on the presence.

Example 53 is a non-transitory computer readable storage medium comprising computer readable instructions that, when executed, cause one or more processors to at least sense an event for locating a host device and receive a broadcast message from the host device. The instructions of Example 53 also cause one or more processors to evaluate the broadcast message and determine if the host device is equipped to propagate a bot in the swarm, and transfer a virtual version of the bot to the host device if the host device is equipped to propagate the bot.

Example 54 includes the storage medium of Example 53, wherein the event is based on a resource of the bot.

Example 55 includes the storage medium of Example 53, wherein the event is based on a location of the bot.

Example 56 includes the storage medium of Example 53, wherein the event is based on a communication history of the bot.

Example 57 includes the storage medium of Example 53, wherein the broadcast message includes a travel parameter of the host device.

Example 58 includes the storage medium of any of Examples 53-57, wherein the swarm is a first swarm and the bot is a first bot, and wherein the instructions further cause the one or more processors to: identify a presence of a second bot in a second swarm; and copy the virtual version of the first bot from the host device to the second bot based on the presence.

Example 59 is a method to propagate a swarm of robots. The method of Example 59 includes sensing an event for locating a host device and receiving a broadcast message from the host device. The method of claim 59 also includes evaluating the broadcast message and determine if the host device is equipped to propagate a bot in the swarm, and transferring a virtual machine to the host device if the host device is equipped to propagate the bot.

Example 60 includes the method of Example 59, further including identifying a resource of the bot and basing the event on the resource.

Example 61 includes the method of Example 59, further including identifying a location of the bot and basing the event on the location.

Example 62 includes the 60 The method of Example 59, further including identifying a communication history of the bot and basing the event on the communication history.

Example 63 includes the method of Example 59, wherein the broadcast message includes a travel parameter of the host device.

Example 64 includes the method of any of Examples 59-63, wherein the swarm is a first swarm and the bot is a first bot, and the method further includes identifying a presence of a second bot in a second swarm, and copying the virtual machine from the host device to the second bot based on the presence.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A mobile apparatus to propagate a plurality of one or more bots, the mobile apparatus comprising:
   a transceiver to broadcast the availability of the mobile apparatus to host one or more virtual bots and to receive a first copy request from a first bot and to receive a second copy request from a second bot; and
   instructions to cause processing circuitry to:
      determine if the mobile apparatus is equipped to propagate a first virtual bot associated with the first bot based on (1) first instructions from the first bot to perform a first task using the first virtual bot and (2) a route of travel of the mobile apparatus, and
      determine if the mobile apparatus is equipped to propagate a second virtual bot associated with the second bot at a same time as the first virtual bot based on (1) second instructions from the second bot to perform a second task using the second virtual bot and (2) the route of travel of the mobile apparatus;
      execute the first virtual bot and the second virtual bot via a virtual partition.

2. The mobile apparatus of claim 1, wherein a portion of resources of the processing circuitry partitioned by the virtual partition is to execute the first instructions of the first virtual bot.

3. The mobile apparatus of claim 2, the first virtual bot to delete itself after execution of the first instructions.

4. The mobile apparatus of claim 2, the first virtual bot to delete itself after an amount of time.

5. The mobile apparatus of claim 1, further including a sensor to provide sensing resources for the first virtual bot.

6. The mobile apparatus of claim 1, wherein the processing circuitry is to authenticate the first virtual bot.

7. The mobile apparatus of claim 1, wherein the first bot is in a first swarm of bots, and the second bot is in a second swarm of bots.

8. The mobile apparatus of claim 1, further including a hypervisor to facilitate separate execution a plurality of virtual bots including the first virtual bot and the second virtual bot respectively associated with a plurality of bots in a swarm.

9. The mobile apparatus of claim 1, wherein the processing circuitry is to determine if the mobile apparatus is equipped to propagate the first virtual bot based on a travel speed of the mobile apparatus.

10. A mobile apparatus to propagate a plurality of bots, the mobile apparatus comprising:
    means for communicating an availability of the mobile apparatus to host one or more virtual bots and for receiving a first copy request from a first bot and a second copy request from a second bot;
    means for determining if the mobile apparatus is equipped to propagate:
       a first virtual bot associated with the first bot based on (1) first instructions from the first bot to perform a first task using the first virtual bot and (2) a route of travel of the mobile apparatus, and
       a second virtual bot associated with the second bot at a same time as the first virtual bot based on (1) second instructions from the second bot to perform a second task using the second virtual bot and (2) the route of travel of the mobile apparatus; and
    means for hosting the first virtual bot and the second virtual bot.

11. The mobile apparatus of claim 10, wherein the first virtual bot includes means for executing the first instructions of the first virtual bot.

12. The mobile apparatus of claim 11, wherein the means for executing is to delete the first virtual bot from the apparatus after at least one of execution of the first instructions or an amount of time.

13. The mobile apparatus of claim 10, wherein the first bot is in a first swarm of bots, and the second bot is in a second swarm of bots.

14. A non-transitory computer readable storage medium comprising computer readable instructions that, when executed, cause one or more processors to at least:
    broadcast an availability of a mobile host device to host a plurality of bots;
    receive a first copy request from a first bot in a swarm of bots;
    receive a second copy request from a second bot;
    perform an evaluation of first operation commands from the first bot, second operation commands from the second bot, and a route of travel of the mobile host device;
    determine if the mobile host device is equipped to propagate a first virtual bot corresponding to the first copy request based on the evaluation and if the mobile host device is equipped to propagate a second virtual bot corresponding to the second copy request based on the evaluation, the mobile host device to propagate the first virtual bot and the second virtual bot at a same time; and
    execute the first virtual bot from a virtual partition when the mobile host device is equipped to propagate the first virtual bot; and
    execute the second virtual bot via the virtual partition when the mobile host device is equipped to propagate the second virtual bot.

15. The storage medium of claim 14, wherein the instructions further cause the one or more processors to execute the first operation commands of the first virtual bot.

16. The storage medium of claim 15, wherein the instructions further cause the one or more processors to delete the first virtual bot after at least one of execution of the first operation commands or an amount of time.

17. The storage medium of claim 14, wherein the swarm of bots is a first swarm of bots, and the second bot is in a second swarm of bots.

18. A method to propagate two or more bots of a swarm of bots in a host device, the method comprising:
    broadcasting an availability of a mobile host device to host a plurality of virtual bots from the swarm of bots, the mobile host device including a computing device outside of the swarm of bots;
    receiving a first copy request from a first bot in the swarm of bots;
    receiving a second copy request from a second bot on the swarm of bots;
    evaluating first instructions from the first bot, the first instructions to perform a first task;
    evaluating second instructions from the second bot, the second instructions to perform a second task;
    evaluating a route of travel for the mobile host device;
    determining if the mobile host device is equipped to propagate a first virtual bot associated with the first bot based on (1) the first instructions and (2) the route;
    determining if the mobile host device is equipped to propagate a second virtual bot associated with the second bot based on (1) the second instructions and (2) the route; and
    providing an interface to execute the first virtual bot and the second virtual bot.

19. The method of claim 18, further including executing the first instructions of the first virtual bot.

20. The method of claim 19, further including deleting the first virtual bot after at least one of execution of the first instructions or an amount of time.

\* \* \* \* \*